(12) United States Patent
Roth et al.

(10) Patent No.: US 11,924,247 B1
(45) Date of Patent: Mar. 5, 2024

(54) ACCESS CONTROL POLICY SIMULATION AND TESTING

(71) Applicant: Amazon Technologies, Inc., Seattle, WA (US)

(72) Inventors: Gregory Branchek Roth, Seattle, WA (US); Daniel Stephen Popick, Seattle, WA (US); Derek Avery Lyon, Palo Alto, CA (US); John Michael Morkel, Western Cape (ZA); Graeme David Baer, Seattle, WA (US); Ajith Harshana Ranabahu, Shoreline, WA (US); Khaled Salah Sedky, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/839,289

(22) Filed: Jun. 13, 2022

Related U.S. Application Data

(60) Continuation of application No. 16/406,758, filed on May 8, 2019, now Pat. No. 11,361,063, which is a
(Continued)

(51) Int. Cl.
*H04L 9/40* (2022.01)
*G06F 16/93* (2019.01)
(Continued)

(52) U.S. Cl.
CPC ............ *H04L 63/164* (2013.01); *G06F 16/93* (2019.01); *G06F 21/33* (2013.01); *G06F 21/604* (2013.01);
(Continued)

(58) Field of Classification Search
CPC . H04L 63/102; H04L 63/164; H04L 63/0853; H04L 69/32; H04L 69/40;
(Continued)

(56) References Cited

U.S. PATENT DOCUMENTS 5,510,777 A    4/1996 Pilc et al.
6,385,729 B1 * 5/2002 DiGiorgio ............. H04L 63/102
                                                              713/172
(Continued)

FOREIGN PATENT DOCUMENTS

WO      2010142170 A1    12/2010

OTHER PUBLICATIONS

Heath et al., "Synchro-Tokens: A Deterministic GALS Methodology for Chip-Level Debug and Test," IEEE Transactions on Computers, IEEE Computer Society 54(12):1532-1546, Dec. 2005.
(Continued)

*Primary Examiner* — Kyung H Shin
(74) *Attorney, Agent, or Firm* — Davis Wright Tremaine LLP

(57) ABSTRACT

A method and apparatus for testing and simulating an access control policy are disclosed. Evaluating an access control policy may be performed by utilizing a deny statement that causes the access request to be rejected despite actions indicated in the access request being authorized. Further, an independent simulation environment may be utilized for testing access control policy evaluation.

20 Claims, 9 Drawing Sheets

Related U.S. Application Data division of application No. 14/042,277, filed on Sep. 30, 2013, now Pat. No. 10,320,624.

(51) Int. Cl.

| | | |
|---|---|---|
| *G06F 21/33* | (2013.01) | |
| *G06F 21/60* | (2013.01) | |
| *G06F 21/62* | (2013.01) | |
| *H04L 43/55* | (2022.01) | |
| G06F 3/06 | (2006.01) | |
| G06F 21/12 | (2013.01) | |
| G06F 21/31 | (2013.01) | |
| G06F 21/52 | (2013.01) | |
| G06F 21/57 | (2013.01) | |

(52) U.S. Cl.
CPC .......... *G06F 21/6218* (2013.01); *H04L 43/55* (2022.05); *H04L 63/102* (2013.01); *G06F 3/0601* (2013.01); *G06F 21/125* (2013.01); *G06F 21/31* (2013.01); *G06F 21/316* (2013.01); *G06F 21/52* (2013.01); *G06F 21/577* (2013.01); *H04L 63/08* (2013.01); *H04L 63/1441* (2013.01)

(58) Field of Classification Search
CPC .............. G06F 16/9535; G06F 16/335; G06Q 30/0236; G06Q 40/12; G06Q 30/0273; G06Q 30/02; G06Q 20/18; G07F 7/10; H04M 3/387
See application file for complete search history.

(56) References Cited

U.S. PATENT DOCUMENTS

| | | | |
|---|---|---|---|
| 7,185,192 B1 | 2/2007 | Kahn | |
| 7,716,473 B1 | 5/2010 | Kraemer et al. | |
| 7,774,444 B1 | 8/2010 | George et al. | |
| 7,840,599 B2 | 11/2010 | Beadles et al. | |
| 7,849,507 B1 | 12/2010 | Bloch et al. | |
| 8,813,170 B2 | 8/2014 | Novak et al. | |
| 8,918,856 B2 * | 12/2014 | Tor | H04L 63/102 |
| | | | 726/12 |
| 8,990,886 B2 | 3/2015 | Lim | |
| 9,053,343 B1 | 6/2015 | Fuller et al. | |
| 9,077,758 B1 | 7/2015 | McGovern et al. | |
| 2003/0191971 A1 | 10/2003 | Klensin et al. | |
| 2006/0015728 A1 | 1/2006 | Ballinger et al. | |
| 2006/0075469 A1 | 4/2006 | Vayman | |
| 2006/0206931 A1 | 9/2006 | Dillaway et al. | |
| 2006/0282876 A1 | 12/2006 | Shelest et al. | |
| 2007/0143827 A1 | 6/2007 | Nicodemus et al. | |
| 2007/0178938 A1 * | 8/2007 | Kravitz | H04M 3/387 |
| | | | 455/411 |
| 2008/0077971 A1 | 3/2008 | Wright et al. | |
| 2008/0109871 A1 | 5/2008 | Jacobs | |
| 2009/0132395 A1 * | 5/2009 | Lam | G06F 16/9535 |
| | | | 705/30 |
| 2009/0165111 A1 | 6/2009 | Zhang et al. | |
| 2009/0193493 A1 | 7/2009 | Becker et al. | |
| 2009/0205016 A1 | 8/2009 | Milas | |
| 2009/0276204 A1 | 11/2009 | Kumar et al. | |
| 2010/0111273 A1 | 5/2010 | Strommer | |
| 2010/0115578 A1 | 5/2010 | Nice et al. | |
| 2010/0131650 A1 | 5/2010 | Pok et al. | |
| 2010/0325262 A1 * | 12/2010 | Allen | H04L 69/32 |
| | | | 709/224 |
| 2011/0321152 A1 | 12/2011 | Tor et al. | |
| 2012/0005727 A1 | 1/2012 | Lee et al. | |
| 2012/0131685 A1 | 5/2012 | Broch et al. | |
| 2012/0291090 A1 | 11/2012 | Srinivasan et al. | |
| 2013/0024907 A1 | 1/2013 | Pal et al. | |
| 2013/0347129 A1 | 12/2013 | Samuelsson et al. | |
| 2014/0156557 A1 | 6/2014 | Zeng et al. | |

OTHER PUBLICATIONS

U.S. Patent and Trademark Office Board Decision on Appeal No. 2017-006396 for U.S. Appl. No. 14/042,233 dated Apr. 10, 2018, 10 pages.

* cited by examiner

Access Control Policy A

```
Allow:  DescribeVirtualComputer
        DescribeVolume
```
— 602

Access Control Policy B

```
Allow:  Describe*

Condition:  IPAddress 12.34.56.7
```
— 604

Access Request

```
Action:  DescribeSecurityGroups

Requester IP Address:  12.34.56.8
```
— 606

Access Control Policy A Remediation Options:

```
Allow:  DescribeVirtualComputer
        DescribeVolume
        DescribeSecurityGroups
```
608

```
Allow:  Describe*
```
610

Access Control Policy B Remediation Options:

```
Condition:  IPAddress 12.34.56.7
or .8
```
612

```
Condition:  IPAddress 12.34.56.*
```
614

FIG. 6

ACCESS CONTROL POLICY SIMULATION AND TESTING

CROSS REFERENCE TO RELATED APPLICATIONS

This application is a continuation of U.S. patent application Ser. No. 16/406,758, filed on May 8, 2019, entitled "ACCESS CONTROL POLICY SIMULATION AND TESTING," which is a divisional of U.S. patent application Ser. No. 14/042,277, filed on Sep. 30, 2013, now U.S. Pat. No. 10,320,624, entitled "ACCESS CONTROL POLICY SIMULATION AND TESTING," the disclosures of which are incorporated herein by reference for all purposes. This application also incorporates by reference for all purposes the full disclosure of U.S. patent application Ser. No. 13/677,212, filed on Nov. 14, 2012, now U.S. Pat. No. 9,053,343, entitled "TOKEN-BASED DEBUGGING OF ACCESS CONTROL POLICIES" and U.S. patent application Ser. No. 14/042,233, filed on Sep. 30, 2013, now U.S. Pat. No. 10,225,152, entitled "ACCESS CONTROL POLICY EVALUATION AND REMEDIATION."

BACKGROUND

Customers utilizing computing resources, such as those provided by a remote resource provider, are able to set access policies associated with the computing resources. The access policies specify information identifying actions associated with the computing resources that users are allowed to perform. If the access policies are not specified as intended by the customer, user requests that the customer intended to be allowed may be denied and vice-versa. In addition, if customers are not provided with services to test their access control policies, the customer may provide more privileges to users than intended. Further, it may be cumbersome for the customer to attempt to remedy access control policies without remediation assistance or simulation environment for testing the access control policies.

Furthermore, some remote resource providers may establish intermediary services that may affect the computing resources of customers or makes changes to the computing resources. By way of example, an intermediary service may scale a customer's resources according to the demand on the resources, whereby the intermediary service may increase the computing resources allocated to the customer when the demand for existing resources increases and may reduce the computing resources when the demand decreases. With such complexity, appropriate and effective access control is difficult to achieve, requiring substantial work, knowledge and skill.

BRIEF DESCRIPTION OF THE DRAWINGS

Various embodiments in accordance with the present disclosure will be described with reference to the drawings, in which:

FIG. 6 shows an example of policy remediation in accordance with at least one embodiment;

DETAILED DESCRIPTION

Figure 1:
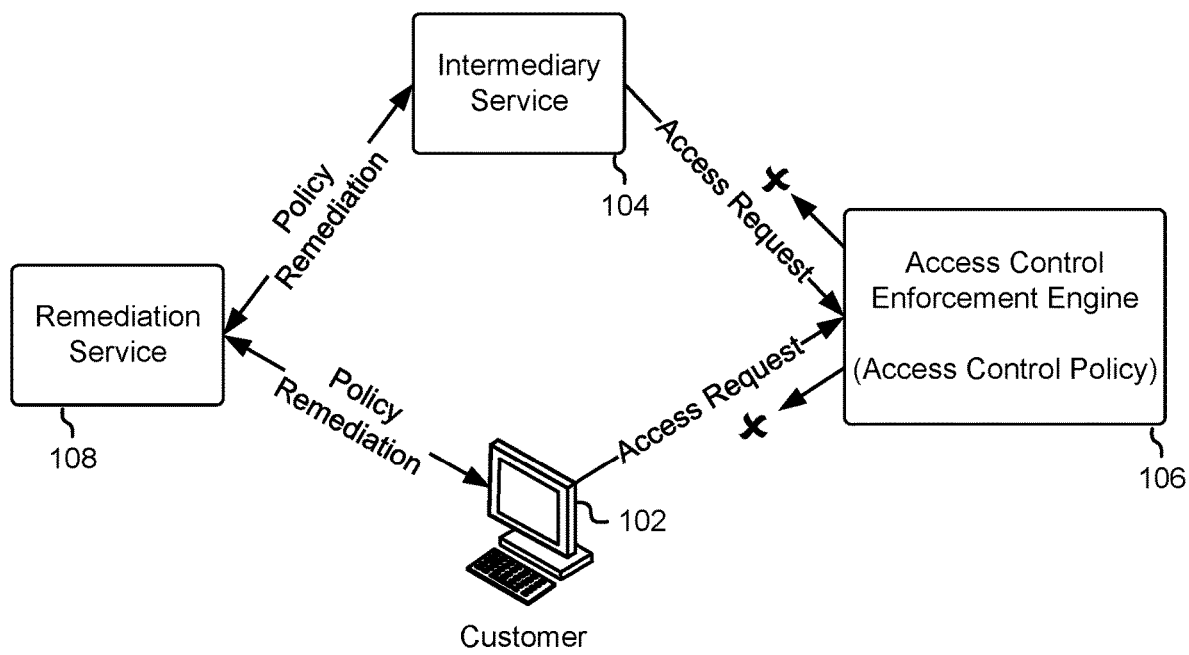
FIG. 1 shows an example of access request evaluation and policy remediation in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include permitting an intermediary service to make an access request on behalf of a customer and to augment resulting debugging information for use by the customer in evaluating relevant access control policies. The augmented debugging information may be provided to the customer and may be usable for obtaining detailed information regarding an evaluation of one or more access control policies associated with the customer.

The customer may utilize the resources of a computing resource service provider and may have one or more computing resources, such as instantiated virtual machines or virtual storage volumes, that are provisioned for use. Further, one or more access control policies may be in place to govern access to the one or more computing resources. The one or more access control policies may specify information identifying actions that may be granted or denied as well as other parameters of permitted or denied actions, such as a requester Internet protocol (IP) address or a time associated with the request. Access requests or actions associated with the access requests may be granted or denied based at least on part on whether an access control policy specifies whether the request or action is to be granted or denied.

An intermediary service, which may be part of the computing resource service provider, may make access requests on behalf of the customer and may affect or receive information about the computing resources provisioned for the customer. The access requests made by the intermediary service may be triggered to the receipt of a second request from the customer or due to one or more access request conditions being satisfied. For example, the intermediary service may be configured to add or remove computing resources for the customer based at least in part on a utilization level associated with the active computing resources. In addition, the intermediary service may be configured to receive a request from the customer to make changes to a plurality of computing resources of the customer and may, in turn, make a plurality of access requests, whereby each of the plurality of access requests may affect a computing resource of the plurality of computing resources.

An access request is evaluated by an access control enforcement engine to determine whether the access request is permitted or denied per one or more access control policies. A requester may be provided with debugging information that specifies whether the access request is granted or denied as well as detailed information specifying one or more reasons for granting or denying the access request. For example, the one or more reasons may make reference to specific policy statements that caused denying the access request or one or more actions or parameters associated with the request that caused denying the access request. The debugging information may be usable by the requester to modify the access request or modify the access control policies in order to cause the request to be granted. The debugging information may be encoded or decrypted using a token such as described in U.S. patent application Ser. No. 13/677,212, entitled "TOKEN-BASED DEBUGGING OF ACCESS CONTROL POLICIES" filed on Nov. 14, 2012, the contents of which are hereby incorporated by reference herein as if fully set forth.

Because the intermediary service makes the request on behalf of the customer and the customer may not be aware of every action associated with the request, the intermediary service may modify or augment the debugging information or the token to provide context information to the customer. Augmenting the debugging information or the token may include removing debugging information that may be deemed to be not relevant or adding context information in order to aid in amending customer policies. For example, technical information may be translated to facilitate providing context to the customer. Further, the intermediate service may modify the policies before making the request. It may translate the received debugging data to reflect the relevant segments in the unmodified policies as received from the customer.

The computing resource service provider may be further equipped with a policy remediation service. The policy remediation service facilitates identifying one or more policy statements that caused an access request to be denied. In addition, the policy remediation service offers one or more options for changing the policy so that a given access request may be granted. A customer or an intermediary service may provide the policy remediation service with debugging information, a token or an access request and the policy remediation service may evaluate an active policy of the customer based at least in part on the provided information. As described herein, the policy remediation service offers one or more policy statements that when added or changed cause the access request to be granted.

FIG. 1 shows an example 100 of access request evaluation and policy remediation in accordance with at least one embodiment. A customer 102 or an intermediary service 104 acting on behalf of the customer 102 make access requests to an access control enforcement engine 106. The access request may affect one or more computing resources of the customer. For example, the access request may be intended to make changes to the computing resources or request information associated with the computing resource. Further, one or more access control policies for the customer may be in place to control access to the computing resources and set parameters that dictate access request that may be authorized. The access control enforcement engine 106 evaluates the access request to determine whether the access request may be granted based at least in part on an existing or active access control policy of the customer 102. As illustrated in FIG. 1, the access control enforcement engine 106 determines that the access request is denied. An indication of the denial of the access request is sent to the customer 102 or the intermediary service 104. Further debugging information that is usable for determining a reason of denial of the access request may also be sent.

The request may be denied because it does not meet requirements specified by the policy. Further, the access request may be a simulation-mode access request is submitted in order for the access control policy to be evaluated and for the debugging information to be examined in order to test the access control policy. Upon receiving an indication of the denial of the access request, the customer 102 or the intermediary service 104 requests a remediation service 108 to provide policy remediation. The remediation service evaluates the access control policy based at least in part on the access request made by the customer 102 or the intermediary service 104 and provides one or more remediation options. The one or more remediation options may include added or modified policy statement when compared to the active access control policy. The remediation options may be used to replace the presently active access control policy in order to cause the sought access request to be granted.

Figure 2:
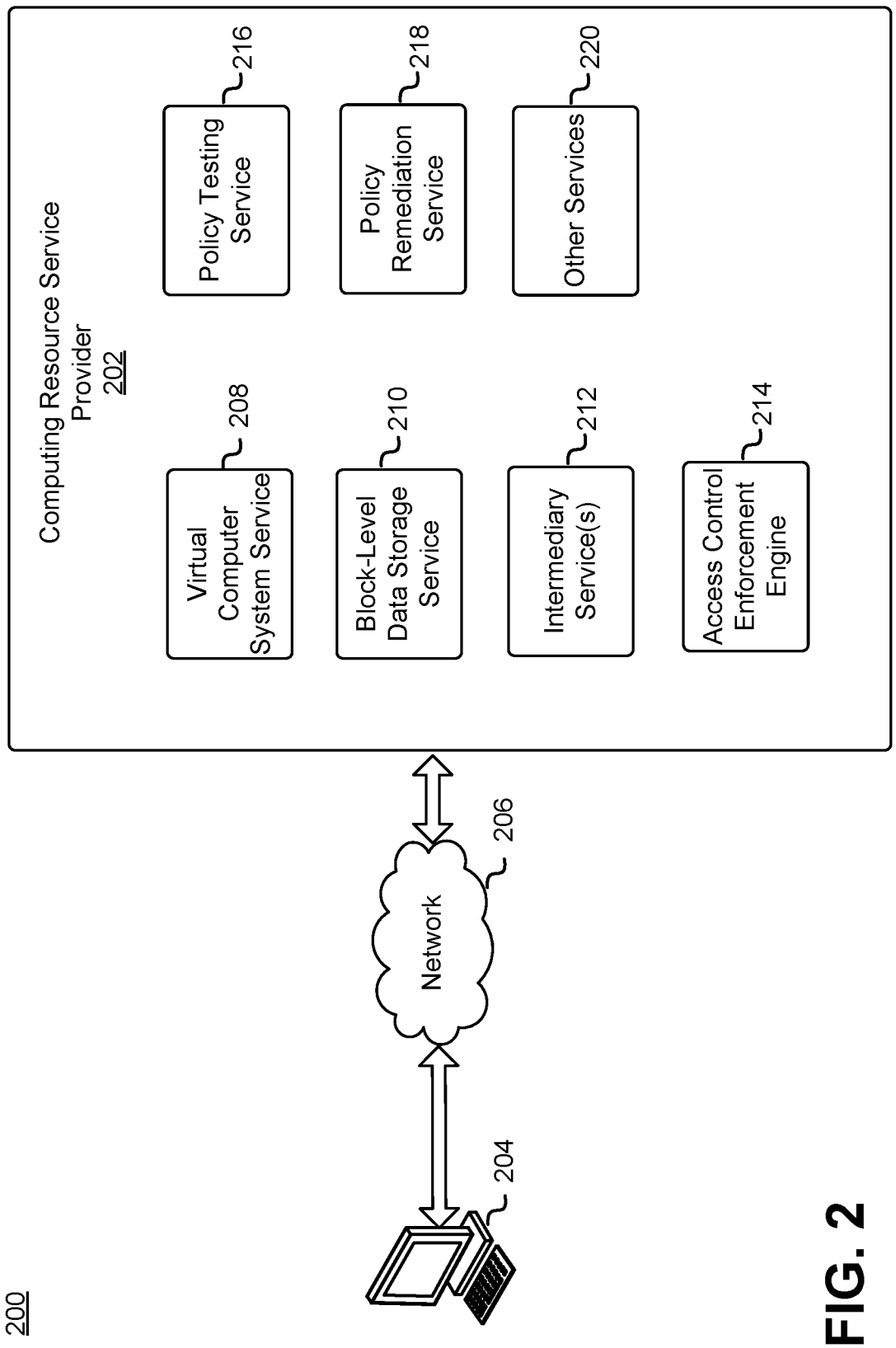
FIG. 2 shows an example of a customer connected to a computing resource service provider in accordance with at least one embodiment.

FIG. 2 shows an example 200 of a customer connected to a computing resource service provider in accordance with at least one embodiment. The computing resource service provider 202 may provide a variety of services to a customer 204. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such the Internet, an intranet or an Internet service provider (ISP) network. Some communications from the customer 204 to the computing resource service provider 202 may cause the computing resource service provider 202 to operate in accordance with one or more embodiments described herein or a variation thereof.

The computing resource service provider 202 may provide various computing resource services to its customers. The services provided by the computing resource service provider 202, in this example, include a virtual computer system service 208, a block-level data storage service 210, one or more intermediary services 212, an access control enforcement engine 214, a policy testing service, a policy remediation service 218 and one or more other services 220. It is noted that not all embodiments described herein include the services 208-220 of the computing resource service provider 202 and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable the one or more intermediary services 212 to access and configure the virtual computer system service 208 or the block-level data storage service 210).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer system service 208 (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

The one or more intermediary service(s) 212 may make calls in the computing resource service provider on behalf of the customer 204 and may cause the customer resources to be affected. The one or more intermediary services 212 may enable resource provisioning, load balancer deployment and health monitoring, among others. The one or more intermediary services 212 may scale the resources allocated to the customer 204 by the virtual computer system service 208 or the block-level data storage service 210, among others, and may receive instructions from the customer 204 and attend to configuring (for example, by making API function calls) the resources of the computing resource service provider 202 in accordance with the instructions.

The computing resource service provider 202 also includes an access control enforcement engine 214. The access control enforcement engine 214 enables secure access to the computing resource service provider 202 and its resources and manages user permissions for accessing the computing resource service provider 202. The access control enforcement engine 214 may determine whether an access request received from the customer 204 or initiated on the behalf of the customer 204 (for example, by the one or more intermediary service 212) is to be allowed or denied based on one or more existing access control policies. The access control policies may specify permitted actions or parameters associated with permitted actions, such as a requester IP address, and the access control enforcement engine 214 may determine whether to permit or deny an access request based on the access control policies.

The policy testing service 216 is an environment for simulating access control policies that enables the user to ensure that an access control policy results in sought access control. The policy testing service 216 enables a customer to set forth an access control policy and test whether an access request is permitted or denied per the access control policy. Accordingly, the policy testing service 216 enables the user to assess the effect to enforcing the access control policy. The policy testing service 216 may be "sandboxed" for enabling simulation and the evaluation of the access request may not require that a pertinent policy is in place or used by the customer. Further, if the policy testing service 216 determines that an action specified by the access request is granted per the policy, the action may not be taken and instead a user is notified that the action may be granted per the policy.

The policy remediation service 218 is responsible for assessing customer policies and determining one or more statements of a customer policy that caused a specific access request or action to be denied (for example, by the access control enforcement engine 214). Further, the policy remediation service 218 may cause the policy statements to be identified based at least in part on evaluating the customer policy based at least in part on the access request. The policy remediation service 218 is further equipped to offer remediation guidance with respect to the customer policy and suggest one or more alternative policy statements that may be adopted to cause the access request to be granted.

The computing resource service provider 202 may additionally maintain one or more other services 220 based at least in part on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services. It is noted that although the computing resource service provider 302 and its associated services and entities are shown to provide service to one customer entity for ease of description in FIG. 3, in various embodiments the computing resource service provider 302 and each of its associated services and entities may provide service to a plurality of customers and devices.

Figure 3:
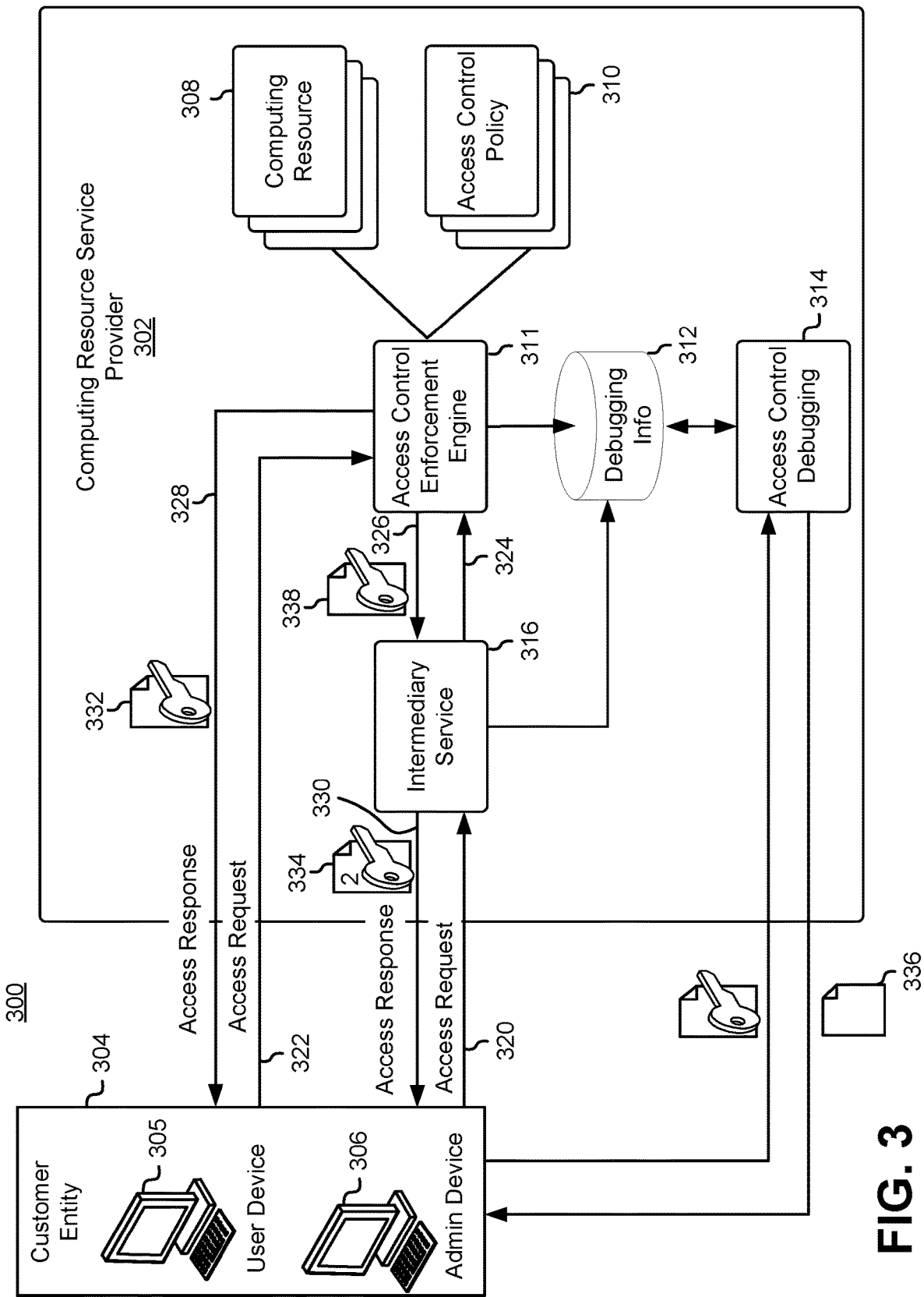
FIG. 3 shows an example of access request and response exchanges between a customer and a computing resource service provider in accordance with at least one embodiment.

FIG. 3 shows an example 300 of access request and response exchanges between a customer and a computing resource service provider in accordance with at least one embodiment. A customer 304 (such as an individual, company or other organization) utilizes services provided by a computing resource service provider 302, for example, to access one or more computing resources 308 provided by the computing resource service provider 302. The customer 304 includes a user (not shown) operating a user device 305 and a system administrator (not shown) operating an administrator device 306. It is noted that although one user device 305 and one administrator device 306 are shown in FIG. 3, more than one user device and more than one administrator device may be used by one or more users or one or more administrators, respectively. The customer 304 may access the computing resource service provider 302 via a network (also not shown), which may be Internet, a local area network ("LAN"), a wide area network ("WAN"), an Internet service provider (ISP) network, a cellular data network and/or other data network.

The computing resources 308 of the computing resource service provider 302 may include a virtual machine, for example, that is instantiated by the virtual computer system service described with reference to numeral 208 in FIG. 2, or a block-level storage volume, for example, that is provided by the block-level data storage service described with reference to numeral 210 in FIG. 2. In addition to having one or more computing resources 308, the computing resource service provider 302 also retains one or more access control policies 310 associated with the one or more computing resources 308 as described in U.S. patent application Ser. No. 13/677,212, entitled "TOKEN-BASED DEBUGGING OF ACCESS CONTROL POLICIES" filed on Nov. 14, 2012, the contents of which are hereby incorporated by reference herein as if fully set forth. The access control policies are used by the computing resource service provider 302 to control access to the one or more computing resources 308 and to determine whether to grant or deny customer requests based at least in part on information related to customer requests and applicable access control policies 310. To that effect, the computing resource service provider 302 includes an access control enforcement engine 311 that utilizes the one or more access control policies 310 to determine whether to grant or deny received customer requests. Upon determining whether to grant or deny a customer request, the access control enforcement engine 311 notifies the customer of the acceptance or denial. The access control enforcement engine 311 may be a service or a library executed in another service.

In addition, the access control enforcement engine 311 stores debugging information 312 associated with the request in a log file and/or a data store 336 as described in U.S. patent application Ser. No. 13/677,212, noted above. The debugging information 312 may be encoded or encrypted and an access control debugging service 314 may decode or decrypt the debugging information upon customer 304. As described herein, the decoding or decrypting of the debugging information 312 may be conditional upon the availability of a token. The token encodes at least some debugging information useful for determining (e.g., by a system administrator) a cause of the denied access. The token may be a data object, message, identifier or any embodiment of information that encodes at least some debugging information related to a requested access to one or more computing resources. The token may include a cryptographic encoding of some or all of the debugging information 312 described herein, such as using a cryptographic key or function to encrypt some or all of the debugging information 312. In some embodiments, the token may include an identifier (such as a hash value) or a reference that may be used to look up more debugging information from a service provider or a third party. In various embodiments, some or all of the debugging information 312 encoded in the token may be inaccessible to the user who receives the token from the service provider. It is noted that although a log file and/or a data store 336 is utilized for storing some or all of the debugging information 312, alternative embodiments may not employ the log file or data store and the debugging information may instead be communicated using the token 330, 332.

The computing resource service provider 302 also includes an intermediary service 316 to facilitate customer 304 access to the computing resource service provider 302. Although one intermediary service 316 is shown in FIG. 3, a plurality of intermediary services may be used to facilitate customer access to the computing resource service provider 302. The intermediary service 316 makes access requests on behalf of the customer 304 and may follow customer policies to appropriately configure the computing resource 308 of the customer 304. The intermediary service 316 may receive requests from the customers and make access request based the receive requests. Alternatively, the intermediary service may retain policies associated with the resources of the customer and may monitor the resources of their utilization and make access requests in accordance with the policies.

As shown in FIG. 3, an access request, which is described in U.S. patent application Ser. No. 13/677,212, noted above, may be made by the customer 304 or the intermediary service 316 to the access control enforcement engine 311. The customer 304, using the user device 305, makes access requests to the one or more computing resource 308 of the computing resource service provider 202, for example, via a Web service interface or other APIs. The user device 305 sends an access request 320 directly to the access control enforcement engine 311 or sends an access request 322 to the intermediary service 316, which in turn, makes one or more access requests 324 to the access control enforcement engine 311 on behalf of the user device 305. The access request 320, 322 made by the user device 305 or the access request 324 made by the intermediary service 316 may be any type of request that is related to a service provided by the computing resource service provider 302, such as logging in to a service interface, provisioning or management of a virtual computer system or a virtual network, management of data stored in a data storage service and the like. The access to the computing resources 308 is governed by one or more access control policies 310.

The access control enforcement engine 311 determines whether to grant or deny the received access request based at least in part on the received access request and applicable access control policies 310. Granting or denying the access request may be based at least in part on credentials provided by the user device in the access request. The access control policies 310 may dictate a permitted Internet protocol (IP) address of the user device 305, a computing resource the user device 305 is permitted to access or one or more operations that the user device 305 is permitted to perform, among others. Upon determining whether to accept or deny the access request, the access control enforcement engine 311 sends a response indicating the acceptance or denial of the access control request. In the case where the access request 324 was received from the intermediary service 316, the access control enforcement engine 311 sends the access response 32 to the intermediary service 316. Alternatively, when the accepted or denied access request 322 is received directly from the user device 305, the access response 328 is sent to the user device 305.

The access response 326, 328 may include an indication that access is granted or denied but may not include detailed context information to enable a determination of exact reasons for acceptance or denial. Context information may include identifying information for the computing resource for which access is denied and one or more applicable or applied access control policies 310 or identifiers thereof. The context information may be encoded in a token 330, 332 that is sent with or separately from the response 326, 328. As described herein, the token 330, 332 may include a data object, message, identifier or any embodiment of information that would allow a user or an administrator to analyze and/or debug the acceptance or denial of access control access or other user-experienced errors. For example, the token 330, 332 may include computing resources and/or operations associated with the access request, access control policies applied or applicable or checks performed for the computing resources and/or operations or the results thereof. Further, the token 330, 332 may include other relevant context information.

Some or all of the debugging information 312 may be encoded in the token and/or stored by the service provider or a third party entity, for example, in a log file and/or a data store 336. The token 330, 332 may be used to store all of the debugging information 312 and none of the debugging information 312 may be stored outside the token 330, 332. Further, the debugging information may 312 be encoded and included in the token 330, 332 in a format that renders the encoded information at least partially inaccessible or transparent to the user receiving the token 330, 332. For example, the debugging information 312 may be encrypted using a cryptographic key that is not intended to be available to the user device 305 or an entity operating the user device 305.

The intermediary service 316 may be capable of decrypting or decoding the received token 330 and may inspect cause for the failure or success of the access request 324. For example, the intermediary service 316 may be an automatic scaling service that is responsible for increasing or decreasing the computing resources 308 allocated to the customer 304. To increase or decrease the resources allocated to the customer 304, the intermediary service 316 may receive a request 320 from the customer 304 requesting the change. The intermediary service 316 may in turn send an access request 324 to the computing resource service provider 302 to make changes to the resources allocated to the customer 304. As may be recognized, while the access request 324 made by the intermediary service 316 is based upon the request 320 received from the customer, the access request 324 made by the intermediary service 316 may include details that are not provided by the customer 304. The details may specify the computing resources or actions associated with the computing resources, among others. For example, the customer 304 may have seven computing resources that are virtual computing instance or machines and the customer 304 may request attaching a virtual storage volume to each of the customer's 304 virtual computing instances. In this example, the intermediary service 316 receiving the customer 304 request in turn makes a request specifying each virtual computing instance and asking for virtual storage volume attachment for each virtual computing instance. Further, the access response 326 and the token 330 received by the intermediary service 316 are response to the request 324 provided by the intermediary service 316 and not necessarily directly responsive to the access request 320 provided by the customer 304, which may be general and may not include particulars associated with the customer's 304 resources.

The intermediary service 316 may decode or decrypt the token 330 and may inspect the token 330 to determine the results of the access request 324. The intermediary service 316 may use the results of the inspection to provide information to the customer 304 related to the access request. The intermediary service 316 may augment the received token 330 to produce augmented token 334, 338 for sending to the customer 304. The augmented token 334, 338 may include information indicating to the customer 304 the reason for the denial or failure of the access request. The augmented token 334, 338 may be encoded with additional information associated with the access request 324 or call made by the intermediary service 316. For example, the customer may request the intermediary service 316 to reboot the customer's 304 computing environment. The computing environment may include a plurality of computing resources and intermediary service 316 may request that the plurality of computing resources of the computing environment be rebooted. If one of the reboot requests failed and a token 330 is received by the intermediary service 316 indicating the reasons for the failure, the intermediary service may augment the token in order to provide context information to the customer 304. The information included in the augmented token 334, 338 may be decipherable by the customer 304.

Alternatively, the intermediary service 316 may return the token 330 unmodified to the customer 304. If the intermediary service 316 provides the augmented token 334 to the customer 304, the intermediary service 316 stores debugging information in a data store or log 336 for retrieval by the customer based at least in part on the augmented token 334, 338. If, on the other hand, the intermediary service 316 provides the token 330 to the customer without augmentation, the intermediary service 316 may rely on the debugging information 312 stored by the access control enforcement engine 311 in the data store or log 336.

The user device 305 or the administrator device 306 of the customer 304 utilizes the token 332 received from the access control enforcement engine 311 or the token 334, 338 received from the intermediary service 316 to receive debugging information 312. The customer 304 provides the token to access control debugging 314 to receive debugging information 312. In some embodiments, the intermediary service 316 may attempt to correct an error condition of the token in order to cause the access required 324 to be successful or granted. Correcting the error condition may include modifying an access control policy 310 of the customer 304 as to cause the access request 324 to be granted or modifying the access request 324 so as to prevent the access request from triggering a denial based at least in part on an existing access control policy 310. The intermediary service 316 may correct the error condition if the intermediary service 316 is permitted or instructed to correct the error condition or if the intermediary service 316 is capable of correcting the error condition.

As described herein, the access control enforcement engine 311 utilizes the one or more access control policies 310 to determine whether the customer is authorized to perform actions indicated in an access request. Further, the request is evaluated to determine whether the request may succeed or fail. A simulation mode access request may be made by the customer. The simulation mode access request may include an indication to the computing resource service provider 302 to evaluate whether the request is authorized but not perform actions associated with the request. Further, the computing resource service provider 302 may return information for determining whether the request would have succeeded had the flag not been associated with the request. The simulation mode access request may be used to determine whether a workflow is authorized before initiating additional steps.

Additionally, the simulation mode access request may be used for testing access control policies. For example, an administrator using an administrator device 306 can establish an access control policy for a user utilizing a user device 305 and the simulation mode access request may be used to confirm that the access control policy is established as desired.

A substitute user do (sudo) based application programming interface (API) may be used to provide a user with credentials for making service requests. The sudo API may include a deny statement that causes service requests to be denied and the deny statement may be detectable as a special statement by the access control enforcement engine 311. A computing resource service provider 302 receiving the service request may detect the deny statement and determine that the request is to be denied. Despite determining that the request should be denied, the computing resource service provider 302 may nonetheless process the request and determine other reasons for the denial of the request in order to provide an enhanced debugging output to the customer 304. Based on the enhanced debugging output, the customer 304 determines whether the request would have been denied had the special deny statement not been present. After processing the request, the computing resource service provider 302 may provide a token to the user, whereby the token may encode the debugging output associated with the request. Based at least in part on the token, the user may determine whether the request would have succeeded absent the deny statement.

An administrator may offer credentials for an identity associated with the administrator to one or more users. The credentials may be operable to impersonate the administrator and may be implemented for a limited period of time as temporary security credentials. Based at least in part on the credentials, the user may make simulation mode requests to the computing resource service provider and test existing access control policies and access requests.

Figure 4:
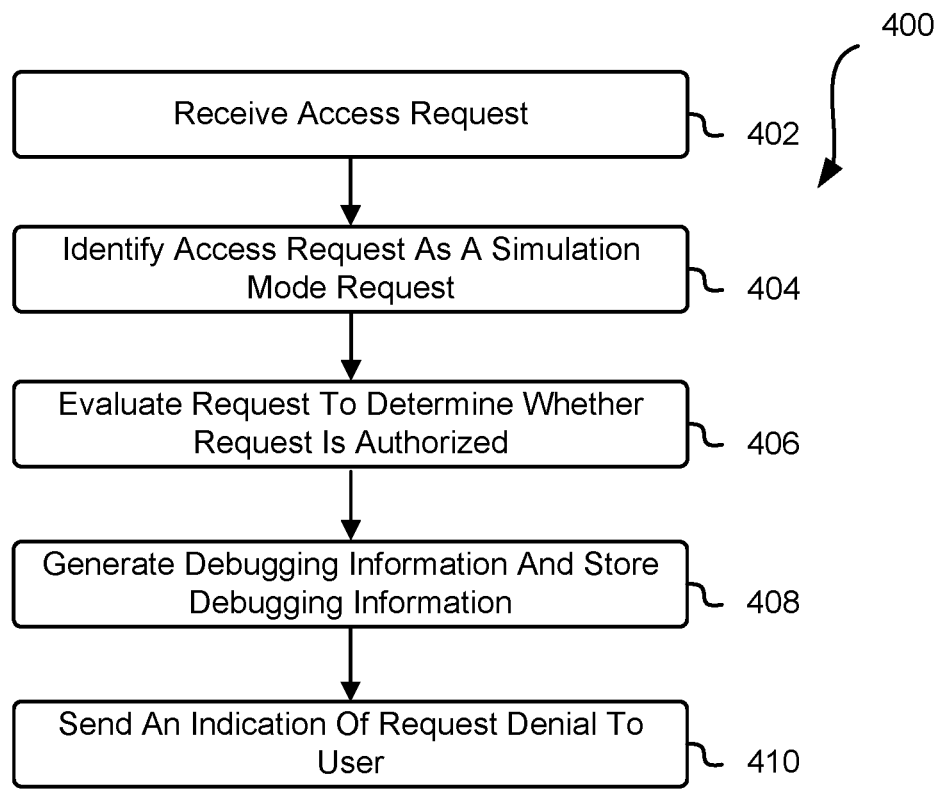
FIG. 4 shows a flow diagram of a method for processing a simulation mode access request in accordance with at least one embodiment.

FIG. 4 shows a flow diagram of a method for processing a simulation mode access request in accordance with at least one embodiment. In the process 400, access control enforcement engine 311 receives 402 an access request. The request may be received over a network in the form of an appropriately configured API call, which may be a web service API call. The access control enforcement engine 311 identifies 404 the access request as a simulation mode access request. The identification of the access request as a simulation mode access request may be based at least in part on an a flag or other indication present in the request that marks the request as a request that may not be serviced, whereby the actions associated with the request may not be performed. However, the request is evaluated in a similar manner as other requests that do not include a flag of a special deny. The request is then evaluated 406 to determine whether the request is authorized. Evaluating the request may include determining whether one or more actions identified in the request are permitted per an existing or active policy. Further, debugging information associated with the request is generated 408 and stored, for example, in a log as described herein. In addition, an indication of the denial of the request is sent 410 to the user. It is noted that in alternative embodiments, instead of or in addition to persistently storing the debugging information, the debugging information may be sent to a requester or a third-party (for example, using an encoded or encrypted token).

In addition to providing a debugging output to a customer, a computing resource service provider may include a remediation service that enables assisting a customer in determining how to modify an existing or active access control policy in order for a request to be granted.

Figure 5:
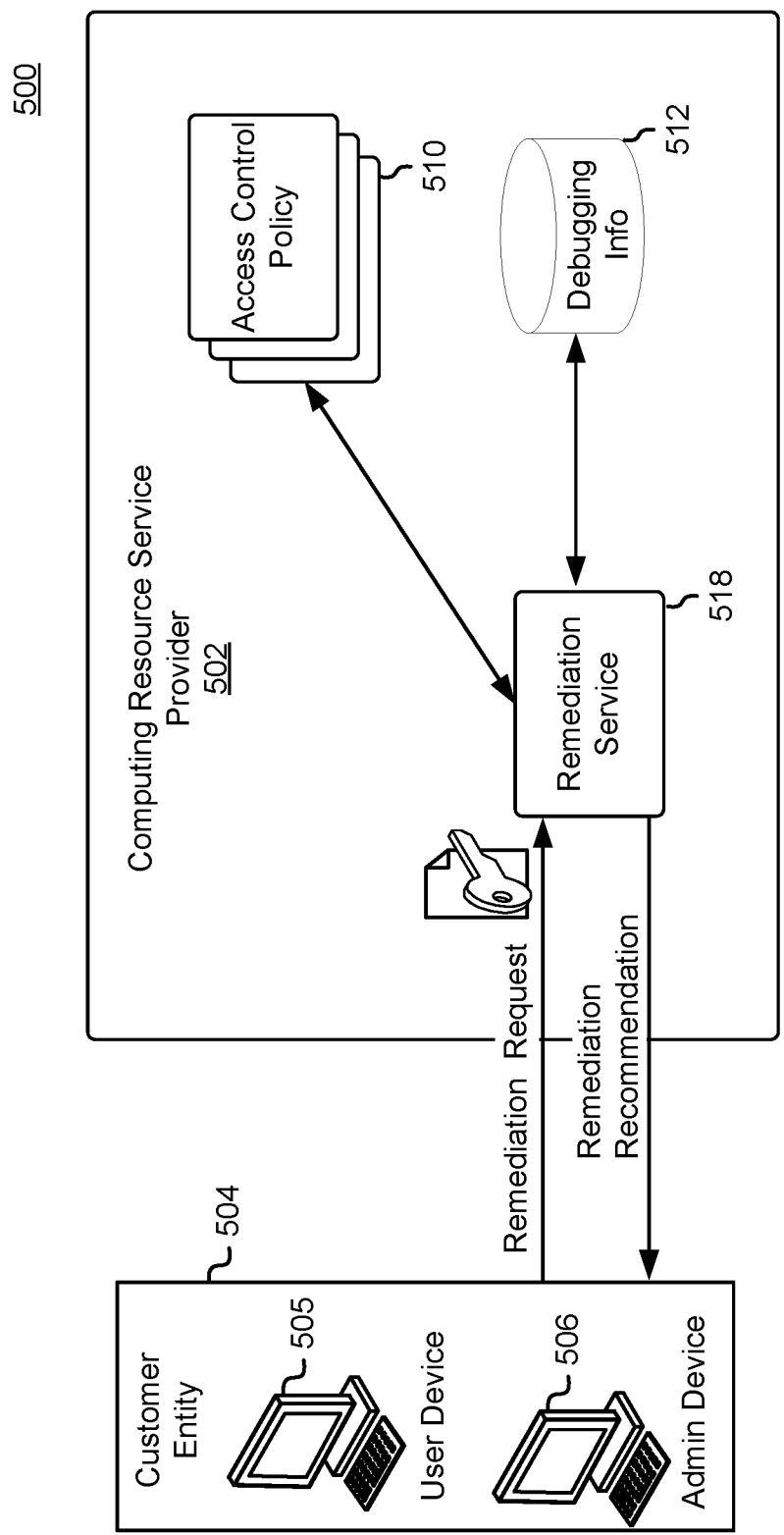
FIG. 5 shows an example of a computing resource service provider including a remediation service.

FIG. 5 shows an example 500 of a computing resource service provider including a remediation service. The computing resource service provider 502 includes a remediation service 518 and a data store for storing debugging information 512 associated with access requests received of the customer 504. The remediation service 518 receives a remediation request from the customer and provides one or more remediation recommendations to the customer 504. The remediation request may include a token received from the computing resource service provider 502. The remediation service 518 may use the token to obtain debugging information 512 associated with the request (for example, by decoding or decrypting the encoded/encrypted debugging information to obtain comprehensive (usable) debugging information or utilizing the token to access the debugging information 512 from the data store). Further, the remediation service may offer one or more changes to an access control policy to enable the request to be granted. The remediation service 518 may offer remediation options for a request that is unfulfillable or in conflict with an access control policy.

As described herein, an access control policy may include one or more policy statements that have information identifying actions that are to be allowed or denied and conditions for one or more parameters of the access request that may be used to deny or allows the access request, among others. An access request may be denied due to the presence of a deny statement in the access control policy that is specific to the access request. Further, an access request may be denied due to the absence of an allow statement in the access control policy that is specific to the access request. For example, an access request policy may specify that only requests that are received from a specified IP address may be granted. A request that is received from a device having an IP address different from the specified IP address may be denied and the denial may be said to be due to the absence of a statement allowing the received IP address. In another example, the access request policy may include a list of one or more allowed actions and a received request may include an action not among the one or more allowed actions. The request may accordingly be denied.

FIG. 6 shows an example 600 of policy remediation in accordance with at least one embodiment. Two access control policies are shown; access control policy A 602 and access control policy B 604. Access control policy A 602 includes a statement of two allowed actions and access control policy B 604 also includes a list of allowed actions in addition to a condition imposed on the IP address of the party providing the access request. An access request 606 is shown in FIG. 6 to include an action and indicate an IP address of the requester.

The access request 606 is denied based at least in part on access control policy A 602 because the access request 606 calls for performing an action (DescribeSecurityGroups) that is not permitted per access control policy A 602. Further, the access request 606 is denied based at least in part on access control policy B 604 because the access request 606 is initiated from an IP address that is not among the IP addresses permitted per access control policy B 604. The remediation service described with reference to numeral 518 in FIG. 5 may offer remediation for access control policy A 608, 610 and remediation for access control policy B 612, 614. To determine an appropriate remediation to a policy, the remediation service evaluates one or more of the items of the access request 606 based on the access control policy 602, 604. In the example of FIG. 6, beginning with the first item (Action: DescribeSecurityGroups), a comparison is made to access control policy A 602. The comparison yields a match between the type of requested action (Describe) and a type of allowed actions per the policy. For every type of action that matches, a comparison is made between the requested action and the allowed action. For access control policy A 602, the requested action is determined not to be among the list of allowed actions. Accordingly, the remediation service may recommend adding the requested action DescribeSecurityGroups to the list of allowed actions per access control policy A 602. Alternatively, the remediation service may recommend allowing all actions of the matching type as provided by the second remediation option 610.

Similarly, for access control policy B 604, beginning with the first item of the access request 606 an evaluation is made to determine whether the item matches a statement of access control policy B 604. The evaluation yields that the type of requested action (describe) matches a type of allowed action in access control policy B 604. Following the evaluation, it is determined with the action is allowed. Because access control policy B 604 allows all "Describe" actions, it is determined that policy remediation is not required for the access request item (DescribeSecurityGroups) to be permitted. The next access request 606 item is then evaluated to determine whether denial of the access request 606 was triggered due to an access control policy B 604 statement that is relevant to the item. The type of access request item is compared to access control policy B 604 to determine a match between the type of item and the type of policy statement. Following a match between the type of item and the type of statement, the IP addresses are compared to determine whether they are different and whether the denial of the access request 606 was due to the policy statement at hand. In the example of FIG. 6 the last decimal of the IP address is determined to be different and the remediation service may determine two options 612, 614 for policy remediation.

In addition to determining possible policy remediation, the remediation service may also determine a level of mapping or coupling between an existing access control policy and a remediation option. The level of coupling may take into account a difference between an access control policy and a remediation option and may be dependent on the extent to which a remediation option results in permitting access requests that would have otherwise been denied. For example, for access control policy A 602, the first remediation option 608 only permits one additional action to be allowed, whereas the second remediation option 610 permits all other "Describe" actions that are not already present in access control policy A 602 to be permitted. In the event that there is a total of 20 "Describe" actions, the remediation service may determine that the second remediation option 610 results in 18 additional actions of the type "Describe" to be allowed whereas the first remediation option 608 results in only one additional action being allowed. The remediation service may rank or rate the remediation options depending on their coupling and present the remediation options based at least in part on their associated level of to which they map to an access control policy.

In some embodiments, the remediation service may provide the customer with an indication of additional privileges granted due to a recommend policy option for remediation. Further, the remediation service may track user or customer preferences when selecting among a plurality of remediation options and may rate remediation options provided to a user or a customer based at least in part on prior customer selection or preference. By way of example, a user that frequently opts for restrictive remediation options, such as adding a policy statement as described with reference to numerals 608 and 612 in FIG. 6, may be provided with similar remediation options or such remediation options may be given priority when presented to the user. Conversely, a user that opts for more broadening remediation options, such as the remediation options described with reference to numerals 610, 614 in FIG. 6, may be provided with the additional broadening remediation options or such remediation options may be given priority when presented to the user. The user may also be offered the choice of having a remediation option randomly selected on behalf of the user for use among available remediation options. Alternatively, the user may be offered that the least broadening remediation option be selected or the remediation option that is most similar to the user's historical choices. A user interface (UI) or a wizard that is executed on a device of the user may be used to provide the user with remediation options or offer the user options for selecting a remediation option.

In some embodiments, policy remediation may be utilized in order to limit in scope or "tighten" an access control policy such that a previously authorized request may remain to be previously authorized while a policy is limited. For example, the remediation service may receive an allowed access request and evaluate the access control policy to determine one or more remediation options that would limit the scope of the access control policy while remaining to allow the access request.

One or more remediation options or one or more remediation sets of statements may each be generated according to a remediation strategy. A remediation strategy may include, for example, adding a new statement to a policy and retaining existing statements of the policy, broadening a set of actions or an element of the policy to include a wildcard or adding an action to a current set of actions. Customer affinity for various remediation strategies may be tracked. Tracking customer affinity may be done by tracking customer selection of remediation options, whereby an association may be maintained between a remediation option, the remediation strategy followed in generating the remediation option and the frequency of a customer's selection of remediation options generated by following a given strategy. The remediation options, for example, as provided to the customer, may be rated according to customer affinity for the remediation strategy followed in generating the remediation option. The collected customer rating information or the tracked customer affinity may be utilized to change or enhance the rating of the remediation options provided to the customer. A feedback mechanism may be in place, whereby a change in customer affinity or customer selection of remediation options is reflected in the rating of the remediation options provided to the customer.

In some embodiments, a value of a complexity metric may be associated with a remediation option. The value of the complexity metric may be based at least in part on the level or the extent to which a policy statement is broadened to arrive at the remediation option. Further, the value of the complexity metric may be based at least in part on a difference in bits, Bytes, or characters between an access control policy and a remediation option.

In an embodiment, in place of offering remediation options, one or more policy statements that cause an access request denial may be identified to the user or the user may be navigated to the one or more policy statements. Further, temporary credentials (for example, sudo-based) may be provided to the user to enable the user to test a modified policy or a modified access request. The modified policy may be encoded in a token that the user may submit to a computing resource service provider. The computing resource service provider may be instructed to utilize the modified policy in testing the access request.

In an embodiment, remediation guidance or identified policy statements that caused a denial may be provided to a device of a technical specialist who may in turn be tasked with amending or modifying the policy. In another embodiment, an intermediary service may have credentials to remediate a policy in a manner that is opaque to the customer. The intermediary service may select a remediation option randomly or based at least in part on a value of the complexity metric or user preferences among others. Alternatively, the intermediary service may select a remediation option as describe here and provide the remediation option to a user device or an administrator device and await acknowledgement before utilizing the remediation option. If an acknowledgement is received or if a pre-defined time period expires before an acknowledgement is received, the intermediary service may utilize the selected remediation option for modifying the policy.

Figure 7:
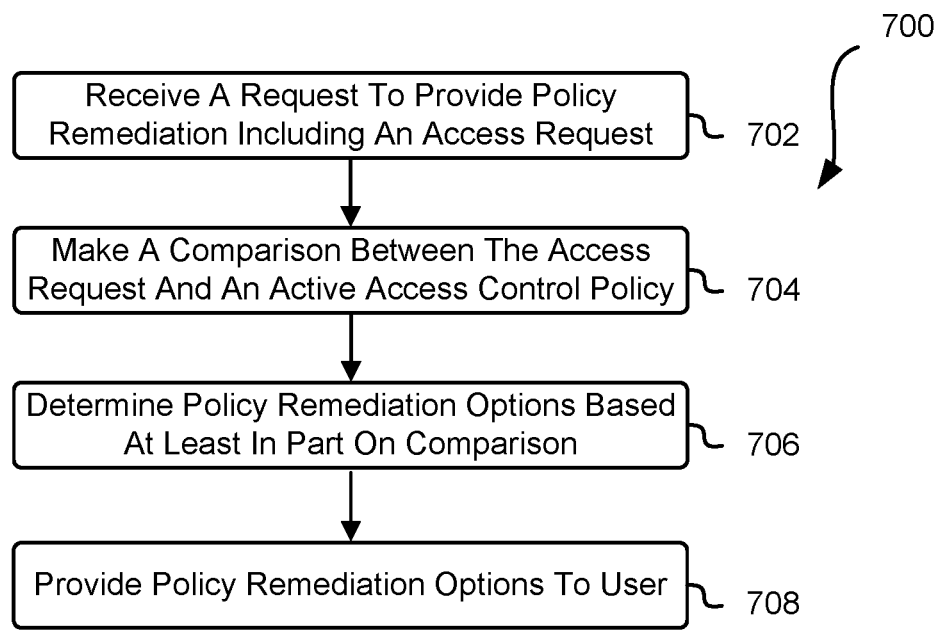
FIG. 7 shows a flow diagram of a method for providing policy remediation in accordance with at least one embodiment.

FIG. 7 shows a flow diagram of a method for providing policy remediation in accordance with at least one embodiment. In the process 700, a remediation service receives 702 a request to provide policy remediation. The request may be received over a network in the form of an appropriately configured API call, which may be a web service API call. Included with the request to provide policy remediation is an access request for which policy remediation is sought. The remediation service then evaluates 704 an active access control policy based at least in part on the access request and determines 706 policy remediation options based at least in part on the evaluation. One or more policy statements may be compared to parameters or actions of the access request and causes for denial of the access request are identified. Further, the absence of allow statements associated with actions may be identified. To generate remediation options an existing policy statement may be modified or broadened to cause the access request to be authorized. The remediation service then provides 708 the policy remediation options to the customer.

As described herein, in addition to evaluating existing and active customer policies for identifying policy fixes, customer policies may be evaluated by a policy testing service prior to deployment and outside of a runtime environment. Policy evaluation outside of the runtime environment is advantageous in that the effect of the policy is allowed to be tested before the policy become active, affects a running system or govern access to one or more computing resources. An underlying system may react differently to a simulation-mode policy than an active policy. For example, a sandboxed simulation-mode may only be used for evaluation and testing and may not affect a running system, whereas an active policy may by definition affect access to computing resources. Further, if policy evaluation outside of the runtime environment fails, there may be no consequences on a running system. In addition, policy evaluation may be performed regardless of whether the runtime environment is active.

An environmental context may be utilized to simulate or mimic conditions under which an access request is made. Environmental parameters may be injected in the testing environment to permit simulation of the access request and a user may be permitted to control the context environment. For example, the environmental contexts may specify a time or date of when the access request is made, an IP address of the requester or an identity associated with the principal making the access request and the like. The time or date may be a future time or date of when the request will be made. The received environmental context information may be in conflict with or different from existing conditions and may specify that the access request is received in a context that is different than the actual context in which the access request is received. Accordingly, the environmental context information may override the actual context information associated with the access request. The context information may indicate that the access request is to be evaluated as being received from a different network address than a network address from which the access request was received at a different time than a time when the access request was received. The inclusion of environmental contexts permits comprehensive testing of customer policies.

Figure 8:
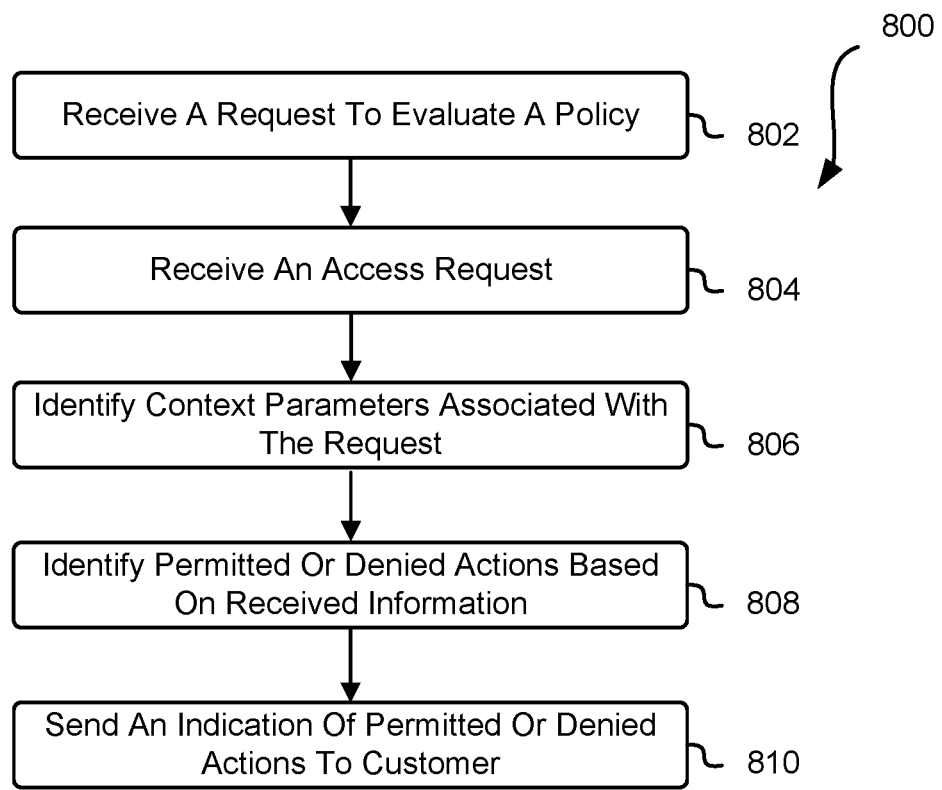
FIG. 8 shows a flow diagram for a method for policy testing in accordance with at least one embodiment.

FIG. 8 shows a flow diagram for a method for policy testing in accordance with at least one embodiment. In the process 800, a policy testing service, such as the policy testing service described with reference to numeral 216 in FIG. 2, receives 802 a request to evaluate a policy. The request may be received over a network in the form of an appropriately configured API call, which may be a web service API call. Further, the request may be received from a customer (for example, user or administrator) and the request may include the policy to be evaluated or may specify an active policy of the computing resource service provider to be evaluated. For example, the policy may be utilized by a subordinate user and the request may be received from an administrator of the customer. If an active policy is specified, the active policy may be retrieved in order for policy evaluation to be performed. The policy testing service also receives 804 an access request for usage in assessing the effect of the policy. As described herein, the access request is evaluated (in an environment outside of runtime) to determine whether the access request will be permitted or denied per the policy. The request to evaluate the policy and the access request may be received in one message or one appropriately configured API call. Further, the received request may be an access determination request that indicates or encodes a request to access a computing resource.

The policy testing service also identifies 806 context parameters associated with the request. The context parameters may be specified by a customer or selected by the policy testing service and may specify a requester IP address to be used for testing and a time at which the request is made. As described herein, context parameters are advantageous in that they enable policy testing to emulate an execution or a runtime environment. The policy testing service then identifies 808 permitted or denied actions based on received policy, access request or context parameters. Identifying permitted or denied actions of the access request may be performed by evaluating the policy under testing based at least in part on the access request as described herein. The policy testing service sends 810 an indication of denied or permitted actions to the customer. Further, the policy testing service sends 810 may provide an indication of the reason of permission or denial of a request. For example, the policy testing service sends 810 may highlight or otherwise indicate a statement in the evaluated policy that caused the access request to be denied.

Although as described herein access to a resource, such as a computing resource, is described as an action associated with the resource or performed on the resource and may be subject to policy conditions, alternative way of modeling access to a resource fall within the scope of the embodiments described herein. The embodiments described herein may be used in a policy system where access to a resource is based at least in part on system-level privileges and where taking an action require a privilege, among others.

Figure 9:
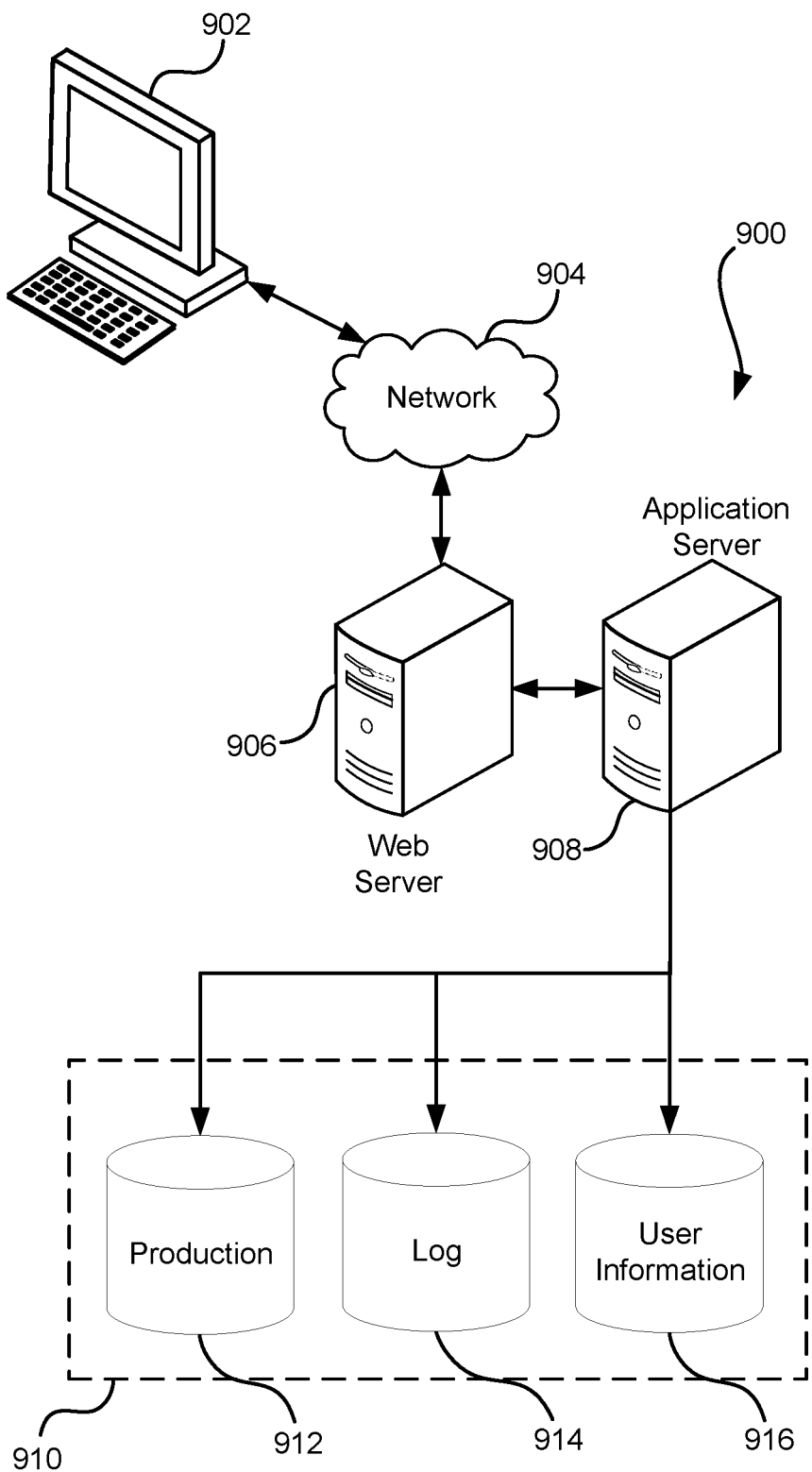
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 902 and the application server 908, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 910 can include several separate data tables, databases or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising: sending, by an intermediary service to an access enforcement engine, an access request including a first indication that identifies the access request as a simulation mode request, the sending of the access request being initiated based at least in part on receiving a second request from a customer of a computing resource service provider, the simulation mode request being an access request which is not to be serviced, and wherein the access enforcement engine is capable of granting the access request;

receiving a second indication, without the access request being serviced, that indicates whether the access request would be authorized had the access request not been the simulation mode request, the second indication being associated with a token, the token being responsive to the access request and encoding information usable for obtaining detailed information regarding an evaluation of one or more access control policies associated with the customer;

augmenting the token to produce an augmented token, the token being augmented to include context information associated with the second request obtained from the customer;

encrypting the augmented token for decrypting by the customer;

sending the augmented token to the customer; and obtaining from the customer a remediation guidance request associated with the access request, the remediation guidance request including the augmented token.

2. The computer-implemented method of claim 1, wherein the access request includes information identifying one or more actions associated with one or more computing resources of the customer.

3. The computer-implemented method of claim 1, wherein augmenting the token to produce the augmented token further includes:

decoding, by the intermediary service, the token to obtain the detailed information;

creating a second detailed information message based at least in part on at least one of the detailed information and the context information; and encoding the second detailed information message to produce the augmented token.

4. The computer-implemented method of claim 1, wherein the access request is evaluated to determine whether the access request is granted or denied as specified by the one or more access control policies associated with the customer.

5. The computer-implemented method of claim 1, wherein:

the access request is an application programming interface function call; and the intermediary service makes the application programming interface function call on behalf of the customer.

6. The computer-implemented method of claim 1, wherein the access request is initiated based at least in part on one or more conditions for scaling customer resources being satisfied.

7. The computer-implemented method of claim 1, wherein the augmented token is encrypted or encoded for decrypting or decoding by the customer.

8. One or more non-transitory computer-readable storage media storing instructions that, when executed by one or more processors of a system, cause the system to:

send an access request including a first indication that identifies the access request as a simulation mode request, the sending of the access request being initiated based at least in part on receiving a second request from a customer of a computing resource service provider, the simulation mode request being an access request which is not to be serviced;

receive a second indication, without the access request being serviced, that indicates whether the access request would be authorized had the access request not been the simulation mode request, the second indication being associated with a token, the token being responsive to the access request and encoding information usable for obtaining information regarding an evaluation of one or more access control policies associated with the customer;

augment the token to produce an augmented token, the token being augmented to include context information associated with the second request obtained from the customer;

encode the augmented token for decoding by the customer;

send the augmented token to the customer; and obtain a remediation guidance request corresponding to the access request, the remediation guidance request including the augmented token.

9. The one or more non-transitory computer-readable storage media of claim 8, wherein the access request is sent by an intermediary service to an access enforcement engine, the access enforcement engine being capable of granting the access request.

10. The one or more non-transitory computer-readable storage media of claim 8, wherein the access request includes information identifying one or more actions associated with one or more computing resources of the customer hosted by the computing resource service provider.

11. The one or more non-transitory computer-readable storage media of claim 8, wherein the instructions cause the system to send an indication of grant or denial of the access request to an intermediary service, the indication being associated with the token.

12. The one or more non-transitory computer-readable storage media of claim 8, wherein the instructions further cause the system to obtain a request to provide remediation guidance including instructions that cause the system to obtain the token usable for obtaining debugging information regarding an evaluation of the one or more access control policies associated with the customer.

13. The one or more non-transitory computer-readable storage media of claim 12, wherein the instructions further cause the system to determine a value of a complexity metric associated with the remediation guidance, the value of the complexity metric being based at least in part on a mapping between the one or more access control policies and the remediation guidance.

14. A computer-implemented method, comprising: sending an access request including a first indication that identifies an aspect of the access request, the sending of the access request being initiated based at least in part on receiving a second request from a customer of a computing resource service provider, the access request being an access request which is not to be serviced;

receiving a second indication, without the access request being serviced, that indicates whether the access request would be authorized had the access request been an access request which was to be serviced, the second indication being associated with a token;

sending a transformed version of the token to the customer of the computing resource service provider; and obtaining a guidance request associated with the access request, the guidance request including the transformed version of the token.

15. The computer-implemented method of claim 14, wherein the token is responsive to the access request and comprises information usable for obtaining information regarding an evaluation of one or more access control policies associated with the customer.

16. The computer-implemented method of claim 15, further comprising evaluating a set of statements of the one or more access control policies based at least in part on a second access request, the set of statements being at least in part responsible for causing the second access request to be unfulfillable.

17. The computer-implemented method of claim 10, further comprising causing a remediation service to generate one or more remediation sets of statements, each of the remediation sets of statements being based at least in part on the set of statements of the one or more access control policies, the one or more remediation sets of statements being usable to cause the second access request to be authorized by modifying or broadening a statement of the set of statements that is at least in part responsible for causing the second access request to be unfulfillable.

18. The computer-implemented method of claim 14, further comprising augmenting the token to produce an augmented token, the token being augmented to include context information associated with the second request obtained from the customer.

19. The computer-implemented method of claim 14, wherein the first indication identifies the access request as a simulation mode request.

20. The computer-implemented method of claim 19, wherein the second indication indicates whether the access request would be authorized had the access request not been the simulation mode request.

* * * * *